No. 780,016.

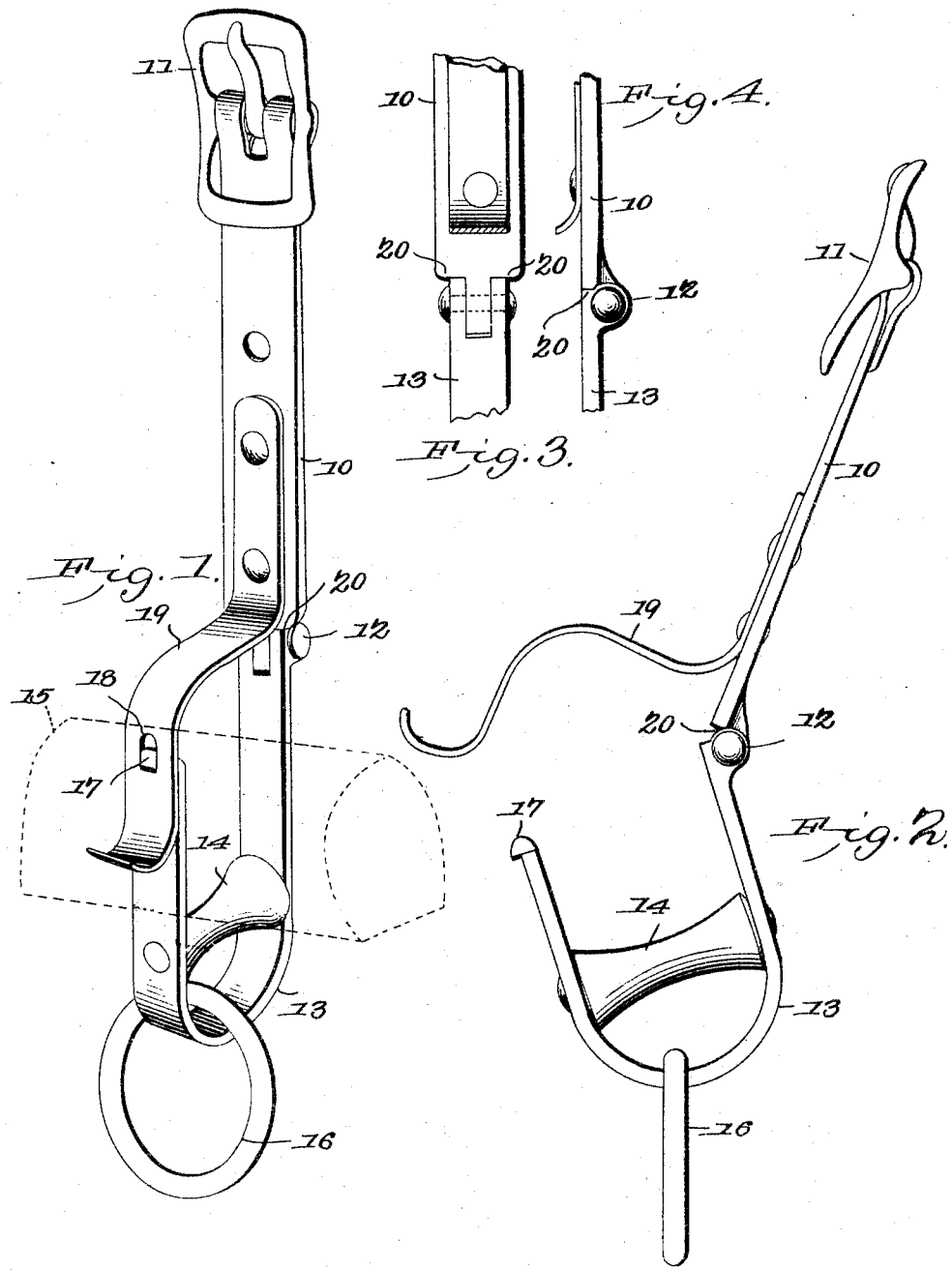

Patented January 10, 1905.

UNITED STATES PATENT OFFICE.

JAMES M. PEYTON, OF PADUCAH, KENTUCKY.

SHAFT-TUG.

SPECIFICATION forming part of Letters Patent No. 780,016, dated January 10, 1905.

Application filed July 9, 1904. Serial No. 215,934.

*To all whom it may concern:*

Be it known that I, JAMES M. PEYTON, a citizen of the United States, residing at Paducah, in the county of McCracken and State of Kentucky, have invented a new and useful Shaft-Tug, of which the following is a specification.

This invention relates to attachments to harness for supporting the thills, and has for its object to improve the construction and produce a device of this character neat in appearance, efficient in action, and which may be attached to any style or form of harness.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages, and the right is therefore reserved of making all the changes and modifications which fairly fall within the scope of the invention and the claims made therefor.

In the drawings thus employed, Figure 1 is a perspective view of the improved device in closed position. Fig. 2 is a side elevation with the device partially in open position. Figs. 3 and 4 are sectional details of the joint between the parts.

The improved device comprises a stock member 10, provided at one end with means, such as a buckle 11, for attachment to the back-band of the harness and having swinging from its other end, as by a hinged joint 12, a V-shaped member 13, the latter preferably provided with a roller 14 to bear beneath the thill (represented by dotted lines at 15) and with a ring 16, sliding loosely therein beneath the roller for connection to the girth-straps of the harness. The free end of the outer leg of the U-shaped member 13 is reduced in size and is turned outwardly, as at 17, to enter an aperture 18 in a resilient arm 19, extending from the member 10. The member 10 is formed with a shoulder 20 adjacent to the joint 12 to produce a stop to limit the movement of the member 13 in one direction, and thus prevent undue outward movement of the same beyond the line of the member 10.

By this simple arrangement when the thill is to be introduced the spring-arm 19 is released and the member 13 swung downwardly, the thill placed within the same and in contact with the roller 14, and the member 13 returned to its upper position and snapping the stud 17 into the aperture 18. It will here be noted that the outwardly-directed lower free end of the arm 19 constitutes a guide to direct the catch-head 17 into the opening 18 when snapping the member 13 into locked engagement with the member 19. Moreover, the free extended end of the member 19 constitutes a handle or finger-piece for convenience in releasing the member 19 from the member 13. The labor of hitching up the horse is thus very materially reduced and a stronger, neater, and more efficient coupling means provided.

Being wholly of metal, the device will outwear several sets of harness and will be therefore a very economical adjunct to the outfit of a vehicle.

The device may be of any size and plated, japanned, or otherwise rendered conformable to the other metal portions of the harness.

Having thus described the invention, what is claimed is—

1. A thill-carrier comprising a stock having one end provided with means for connection with a back-band, a substantially U-shaped rigid member having one end hung from the stock and its opposite end terminating in a catch-head, and a spring-arm connected to the stock and offset therefrom to close the open upper end of the U-shaped member with its outer free end disposed to overlap the free side of said member and provided with a notch to receive the catch-head, the free extremity of the spring member being extended outwardly to form a guide for the latch and a handle for releasing the spring member from the latch.

2. A thill-carrier consisting of a stock having at one end means for connecting to the back-band of the harness and terminating at the other end in a hinge member and laterally-extending stop-shoulders, a U-shaped member having at the terminals of one of its legs a hinge member for connection with the hinge member of said stock and provided with lateral stops for engaging the stop-shoulders on the same to limit the swinging movement of said U-shaped member in one direction, a resilient arm connected to said stock and extending over the free leg of said U-shaped member and having means for detachable connection to the same, and means for connecting the girth-straps detachably to said U-shaped member.

3. A thill-carrier comprising a stock having one end provided with means for connection with a back-band, a rigid substantially U-shaped member having one end swung from the stock, and a spring-arm carried by the stock and offset therefrom to extend across and close the open top of the U-shaped member with its free end lapping the free side of said member, there being a detachable latch connection between the spring-arm and the free end of the U-shaped member, the free end of the spring-arm being extended outwardly to form a handle for releasing the same.

4. A thill-carrier comprising a stock, a buckle carried by the upper end of the stock, a rigid substantially U-shaped member having one end hinged to the lower end of the stock, a roller carried transversely within the U-shaped member, a link hung from the lower end of said member, and a spring-arm carried by the stock and offset therefrom to extend across and close the open top of the U-shaped member with its free extremity overlapping the free side of the U-shaped member and extended outwardly therefrom to form a handle, the free extremity of the U-shaped member terminating in a catch-head, and the spring-arm being provided with a notch into which the catch-head is capable of snapping.

In testimony that I claim the foregoing as my own I have hereto affixed my signature in the presence of two witnesses.

JAMES M. PEYTON.

Witnesses:
  MATTIE J. BROWNE,
  D. H. HUGHES.